Patented Mar. 17, 1936

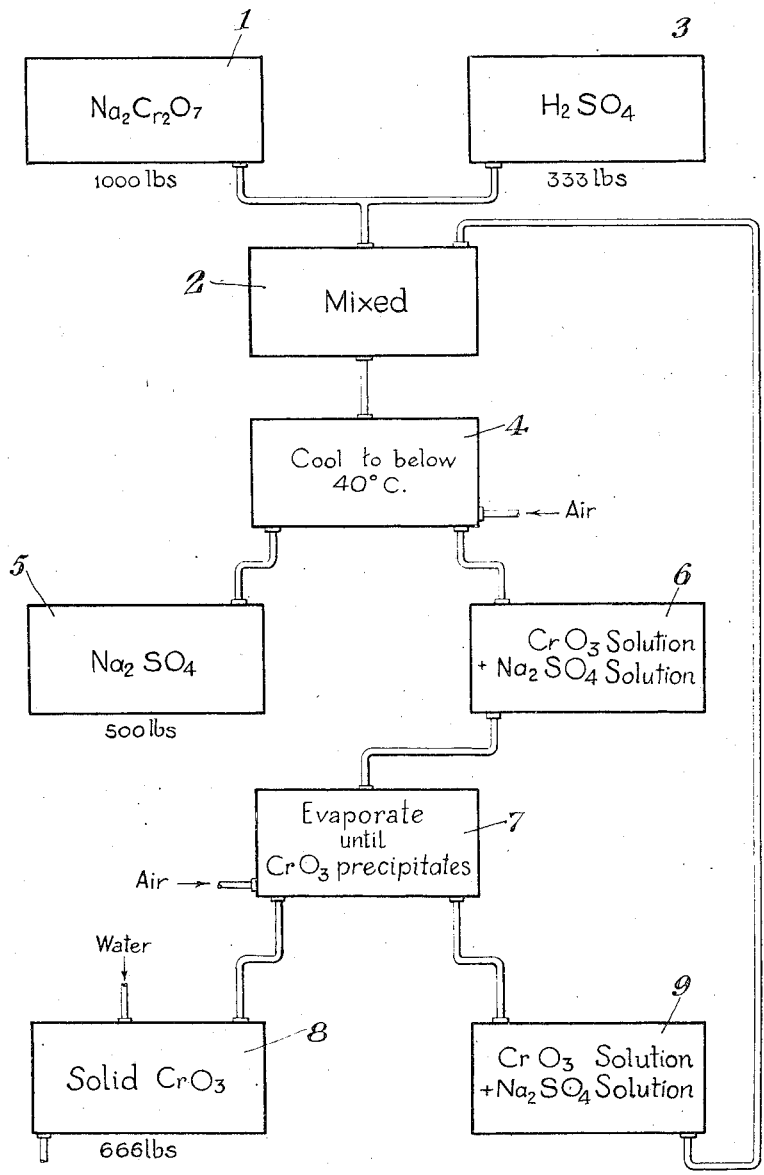

2,034,256

UNITED STATES PATENT OFFICE 2,034,256

PROCESS FOR PRODUCING CHROMIC ACID

Joseph J. Vetter, Hackensack, N. J., assignor to Natural Products Refining Co., Jersey City, N. J., a corporation of Delaware Application May 27, 1930, Serial No. 456,066

14 Claims. (Cl. 23—145)

My invention relates especially to a process of producing chromic acid, preferably continuously, by a method in which very high yields are obtained and by which chromic acid, practically 100% pure, may be produced.

An object of my invention is to provide a method whereby chromic acid may be obtained preferably of great purity and which may contain less than 1/1000 of 1% impurities and which may be carried out continuously. A further object is to provide a process of this character by utilizing commercial sodium bichromate, $Na_2Cr_2O_7,2H_2O$ notwithstanding the presence of sodium chloride as an impurity therein, inasmuch as my process involves the elimination of the chloride in the course of the process. This is very desirable inasmuch as the presence of the chlorine or sodium chloride materially interferes with the effectiveness of the different steps in the process. A further object is to carry out the process in such a manner as to separate out the sodium sulfate in an effective manner, the same being accomplished by appropriately regulating the temperatures used for this purpose. Again, a further object is to effectively remove the chromic acid, $CrO_3$, from the liquor containing the chromic acid and sodium sulfate, after partial removal of the latter, this being accomplished by maintaining a comparatively high temperature during the removal of the chromic acid from the liquor. Another object is to carry out this separation during the injection of air to establish conditions similar to reduced pressure, thus increasing the yield.

Again, another object is to carry out the process continuously by returning the residual liquor, after sodium sulfate and chromic acid have been crystallized out to a large extent therefrom, to the previous liquor from which part of the sodium sulfate and chromic acid are to be crystallized out. Further objects will appear from the detailed description of my invention hereinafter.

While my invention is capable of embodiment in many different forms, for the purpose of illustration I have described only certain forms of my invention hereinafter, and while it is capable of being carried out in connection with many different types of apparatus, I have indicated, diagrammatically only one form of apparatus for use in connection therewith in the accompanying drawing.

The figure is a diagrammatic representation of an apparatus or a series of steps used in carrying out my invention.

In carrying out my process, reference being had to the drawing, I preferably start with commercial sodium bichromate, $Na_2Cr_2O_7,2H_2O$ which contains some sodium chloride NaCl to which may be added about 10% thereof by weight of water to make the materials more liquid. This is supplied in the process from a container 1 to a mixing chamber 2. Sulphuric acid is also supplied to the mixing chamber 2 from a chamber 3 containing sulphuric acid having a strength preferably of 60° Bé. An amount of the sulphuric acid is added to the mixing chamber 2 equal to about ⅓ of pure $H_2SO_4$ by weight of the sodium bichromate. There results, as a consequence, a mixture containing chromic acid $CrO_3$, sodium sulfate $Na_2SO_4$, water, and some chlorine. These are supplied to a cooling chamber 4, where they are cooled to a temperature of 40° C. or lower, but preferably a temperature of 20° C. This cooling is preferably carried out by injecting air at a temperature of 20° C. into the same, which not only cools the mixture to the desired temperature, but eliminates chlorine therein. As a result, about 70% of the sodium sulfate present crystallizes out, which is filtered off and delivered to a storage container 5. The cooling to remove the sodium sulfate is preferably carried out during a period of from 2 to 3 hours. The remaining solution containing chromic acid, some sodium sulfate and water in chamber 6 is then boiled down in an evaporator 7, preferably under a reduced pressure of 18 inches of mercury, or while air is being injected into the same to secure a similar effect, for a period of about 3 hours until the liquor is preferably ½ of the size by volume of the liquor before the beginning of the boiling operation, and the chromic acid begins to separate out, after which the liquid is maintained at a temperature above 50° C., but preferably 70° C. As a result, 60% of the chromic acid present crystallizes out in a form which is practically 100% pure, inasmuch as it contains less than 1/1000 of 1% of impurity. This is filtered off and conveyed to a storage receptacle 8, where the chromic acid crystals may be washed with a little water to remove the residual mother liquor. The residual solution which accumulates in the receptacle 9, containing chromic acid, sodium sulfate and water, is then returned to the mixing chamber 2, to be added to the main mixture of chromic acid and sodium sulfate formed by the action of sulphuric acid on the sodium bichromate.

In this manner the process may be carried out continuously, the substantially pure chromic acid and the sodium sulfate being removed as desired therefrom. The entire process for the passage of a given amount of material therethrough generally consumes about 24 hours.

The process, as above described is particularly effective by reason of the high yields obtained as a result of the conditions of operation and especially the temperatures utilized therein although the injection of the air currents involving the elimination of impurities and producing effects similar to reduced pressures have also a great advantage in securing the results referred to.

It is to be understood that my invention is capable of many changes and modifications both in the process and apparatus used without departing from the spirit of the invention as set forth in the claims. For instance, it will be understood that instead of carrying out the process with sodium salts I may use instead the corresponding potassium salts which are to be considered herein as the equivalent thereof. That is to say, wherever I have used the term "sodium" in the specification or claims, the said term is understood to signify a salt of either of the two alkali metals, sodium or potassium.

I claim:

1. The process which comprises forming chromic acid by treating sodium bichromate with sulphuric acid and then crystallizing out sodium sulfate therefrom while injecting air into the same so as to cool the same to a temperature of about 20° C.

2. The process which comprises forming chromic acid by treating sodium bichromate containing sodium chloride with sulphuric acid and then crystallizing out sodium sulfate therefrom while injecting air into the same so as to remove substantially all the chlorine therefrom.

3. The process which comprises forming chromic acid by treating sodium bichromate with sulphuric acid and then crystallizing out sodium sulfate therefrom while injecting air into the same so as to cool the same to a temperature below 40° C.

4. The process which comprises producing chromic acid by treating sodium bichromate with sulphuric acid, crystallizing out sodium sulfate therefrom, boiling down the liquor while injecting air into the same and crystallizing out chromic acid therefrom while the liquid is being maintained at a temperature of about 70° C.

5. The process which comprises producing chromic acid by treating sodium bichromate with sulphuric acid, crystallizing out sodium sulfate therefrom, boiling down the liquor while injecting air into the same and crystallizing out chromic acid therefrom while the liquid is maintained at a temperature above 50° C.

6. The process which comprises producing chromic acid by treating sodium bichromate with sulphuric acid, cooling the liquor to precipitate sodium sulfate therefrom, which is then removed, concentrating the residual liquor to precipitate chromic acid therefrom which is then removed, and returning the resulting liquor to a previous liquor in the process containing chromic acid and sodium sulfate for subjection to the same separation treatment therewith.

7. The process which comprises producing chromic acid by treating sodium bichromate containing sodium chloride with sulphuric acid, cooling the liquor to precipitate sodium sulfate therefrom at a temperature below 40° C., while injecting air and removing chlorine, which sodium sulfate is then removed, concentrating the residual liquor to precipitate chromic acid therefrom, which is then removed, and returning the resulting liquor to a previous liquor in the process containing chromic acid and sodium sulfate for subjection to the same separation treatment therewith.

8. The process which comprises producing chromic acid by treating sodium bichromate containing sodium chloride with sulphuric acid, cooling the liquor to precipitate sodium sulfate therefrom, at a temperature below 40° C., while injecting air and removing chlorine, which sodium sulfate is then removed, concentrating the residual liquor to precipitate chromic acid therefrom, at a temperature above 50° C., which is then removed, and returning the resulting liquor to a previous liquor in the process containing chromic acid and sodium sulfate for subjection to the same separation treatment therewith.

9. The process which comprises forming chromic acid by treating sodium bichromate with sulphuric acid in the proportions of substantially one part of sodium bichromate containing two mols of water for each mol thereof and to which there is added approximately 10% thereof by weight of water together with an amount of approximately 60° Bé. sulphuric acid such that the pure sulphuric acid therein will equal approximately one third of the weight of the sodium bichromate, and then crystallizing out sodium sulphate therefrom at a temperature below 40° C.

10. The process which comprises forming chromic acid by treating sodium bichromate with sulphuric acid in the proportions of substantially one part of sodium bichromate containing two mols of water for each mol thereof and to which there is added approximately 10% thereof by weight of water together with an amount of approximately 60° Bé. sulphuric acid such that the pure sulphuric acid therein will equal approximately one third of the weight of the sodium bichromate, and then crystallizing out sodium sulfate therefrom at a temperature of about 20° C.

11. The method of producing chromic acid of high purity by the interaction of sodium bichromate and sulfuric acid in water solution which comprises precipitating the chromic acid from a hot aqueous solution of a concentration which holds a sodium sulphate in solution with part of the chromic acid while precipitating a large part of the chromic acid therefrom, and separating the precipitated chromic acid from the still hot solution.

12. The method of producing chromic acid of high purity by the interaction of an alkali metal bichromate and sulfuric acid in water solution which comprises precipitating the chromic acid from a hot aqueous solution of a concentration which holds an alkali metal sulphate in solution with part of the chromic acid while precipitating a large part of the chromic acid therefrom, and separating the precipitated chromic acid from the still hot solution.

13. The method of producing chromic acid of high purity by the interaction of an alkali metal bichromate and sulfuric acid in water solution which comprises precipitating the chromic acid from a hot aqueous solution of a concentration which holds a neutral alkali metal sulphate in solution with part of the chromic acid while precipitating a large part of the chromic acid therefrom, and separating the precipitated chromic acid from the still hot solution.

14. The method of producing chromic acid of high purity by the interaction of sodium bichromate and sulphuric acid in water solution which comprises precipitating the chromic acid from a hot aqueous solution of a concentration which holds neutral sodium sulphate in solution with part of the chromic acid while precipitating a large part of the chromic acid therefrom, and separating the precipitated chromic acid from the still hot solution.

JOSEPH J. VETTER.